United States Patent [19]

Kato

[11] Patent Number: 4,712,139

[45] Date of Patent: Dec. 8, 1987

[54] IMAGE COMMUNICATION APPARATUS

[75] Inventor: Yoshiaki Kato, Kurume, Japan

[73] Assignee: Canon Kabushiki Kaisha, Tokyo, Japan

[21] Appl. No.: 664,305

[22] Filed: Oct. 24, 1984

[30] Foreign Application Priority Data

| Oct. 28, 1983 | [JP] | Japan | 58-200752 |
| Oct. 28, 1983 | [JP] | Japan | 58-200753 |
| Jan. 25, 1984 | [JP] | Japan | 59-010337 |

[51] Int. Cl.⁴ .......................................... H04N 1/32
[52] U.S. Cl. .................................. 358/257; 358/280; 358/285; 358/304
[58] Field of Search ............... 358/257, 280, 285, 286, 358/288, 293, 294, 304; 250/578

[56] References Cited

U.S. PATENT DOCUMENTS

| 3,499,975 | 3/1970 | Arps | 358/260 |
| 3,622,695 | 11/1971 | Rugaber | 358/260 |
| 4,367,493 | 1/1983 | Matteson | 358/288 |
| 4,439,790 | 3/1984 | Yoshida | 358/256 |
| 4,445,198 | 4/1984 | Yamamoto | 358/256 |
| 4,591,727 | 5/1986 | Gaebelein et al. | 358/288 |
| 4,598,323 | 7/1986 | Honjo et al. | 358/285 |
| 4,622,594 | 11/1986 | Honjo et al. | 358/293 |
| 4,631,596 | 12/1986 | Yaguchi | 358/257 |

Primary Examiner—Edward L. Coles, Sr.
Attorney, Agent, or Firm—Fitzpatrick, Cella, Harper & Scinto

[57] ABSTRACT

An image communication apparatus comprises: reader for reading an image on an original and converting to an electrical signal; a memory for storing the image data corresponding to the electrical signal; a detector for detecting that an unused memory area in the memory becomes a predetermined amount; an interrupter for interrupting the operations of the memory and reading means in response to a detection output from the detector; a transmitter for transmitting the image data stored in the memory; and a control unit for allowing the operations of the reader and memory to be restarted after the transmission by the transmitter from the location where the operation of the reader was interrupted or from a location before the above interrupted location. This apparatus can certainly perform the image communication using a memory of a small capacity. In case of transmitting and receiving an original longer than a standard size, the recording sheets after the reception can be easily connected and reproduced.

12 Claims, 10 Drawing Figures

IMAGE COMMUNICATION APPARATUS

BACKGROUND OF THE INVENTION

1. Field of the Invention

The present invention relates to an image communication apparatus for transmitting and receiving image information, such as a facsimile apparatus or the like.

2. Description of the Prior Art

In conventional facsimile apparatuses, particularly, in systems whereby an apparatus on the image reception side has recording sheets such as cut sheets or the like on which continuous recording cannot be performed, when an original longer than a standard length of recording sheet is transmitted, there may occur a case in which image information recorded on such a long original overflows the recording sheet. For prevention of this overflow, a method is known whereby the image data which could not recorded on the first recording sheet is divided and transmitted as a second set of image data.

However, in a facsimile apparatus having such a division sending function, the divided image data is recorded as the second set of image data from the portion just subsequent to the break in the first recording sheet. Therefore, it is difficult for an operator on the reception side to reproduce the complete form by coupling the recording sheets after the reception.

On the other hand, conventionally, there is known a facsimile apparatus whereby image data is stored in a memory and thereafter the image data is transmitted in accordance with the processing speed of the apparatus on the image reception side in consideration of the minimum transmission time or the like on the image reception side. However, if the image data exceeds the memory capacity, it cannot be communicated, so that a memory having a large capacity is needed in a conventional facsimile apparatus. In addition, in order to save the memory or reduce communication time, various kinds of compressing methods to compress the input image data are known. However, the compression of image data has the drawback that the amount of information contrarily increases with a high-density original, so that the execution of data compression cannot make the memory capacity as small as would be diserable.

Therefore, a conventional facsimile apparatus requires a memory which can sufficiently store the image data of one sheet of original by compressing it. Particularly, in a facsimile apparatus which performs the communication using, as a unit, the information of one sheet of original of a predetermined size, there is a risk that the portion of image data from an original of a high density image which overflows the memory cannot be transmitted or the communication itself ends as an error.

SUMMARY OF THE INVENTION

The present invention is made in consideration of the above-mentioned points, with the intention of providing an image communicating apparatus which can easily perform the connection and reproduction of the recording sheets after the reception in case of the transmission and reception of an original longer than a standard length.

Another object of the invention is to provide an image communicating apparatus which can reliably perform image communication by means of a memory of a small capacity.

Still another object of the invention is to provide an image communicating apparatus which can reliably perform image communication by means of a memory of a small capacity and can easily carry out the connection and reproduction of the recording sheets after the reception in the case where division transmission occurs.

The above and other objects, features and advantages of the present invention will become apparent from the following detailed description with reference to the accompanying drawings.

DESCRIPTION OF THE PREFERRED EMBODIMENTS

(First Embodiment)

In the first embodiment, a transmitter does not have a memory corresponding to one page and an example of a facsimile transmitting apparatus is shown which can perform transmission to any receiver having a roll paper or sheet papers.

Figure 1:
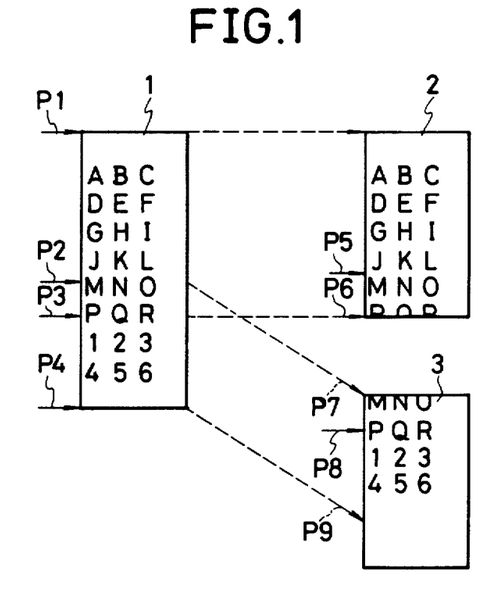
FIG. 1 is a diagram for explaining a first embodiment of the invention.

FIG. 1 is a diagram to explain the state of communication by the facsimile apparatus in this embodiment, in which a reference numeral 1 denotes a transmitting original longer than each of sheet-like recording papers 2 and 3 shown in the upper and lower portions on the right side in the drawing. Image data on the transmitting original 1 is read out line by line in the horizontal direction in the drawing and is sequentially transmitted.

In the embodiment, in the case of transmitting the original 1 as shown in the drawing, the transmission control is performed so that the image data from point P1 to point P3 of the original 1, corresponding to the whole length of recording sheet 2, is recorded on the first recording sheet 2. Also, the control is carried out so that the image data from point P2, which is located backward from point P3 by a predetermined distance, to the last point P4 of the original is recorded on the second recording sheet 3.

Therefore, as shown in the drawing, the image data from point P1 to point P3 of the original 1 and the image data from point P2 to point P4 are transmitted to the recording sheets 2 and 3, respectively, such that parts of those image data overlap. Namely, the image data from point P2 to point P3 of the original 1 is recorded in the last area from point P5 to P6 of the recording sheet 2. On one hand, the image data from point P2 to point P3 is overlappingly recorded in the portion from the head point P7 to point P8 of the second recording sheet 3. The reception and recording with respect to the second sheet end at point P9, corresponding to point P4 of the transmitting original 1.

By performing the overlap transmission in this way, the original can be easily reproduced by overlapping and adhering the overlapped portions or other method.

An arrangement of the facsimile apparatus for performing such communication as mentioned above will then be explained in detail.

Figure 2:
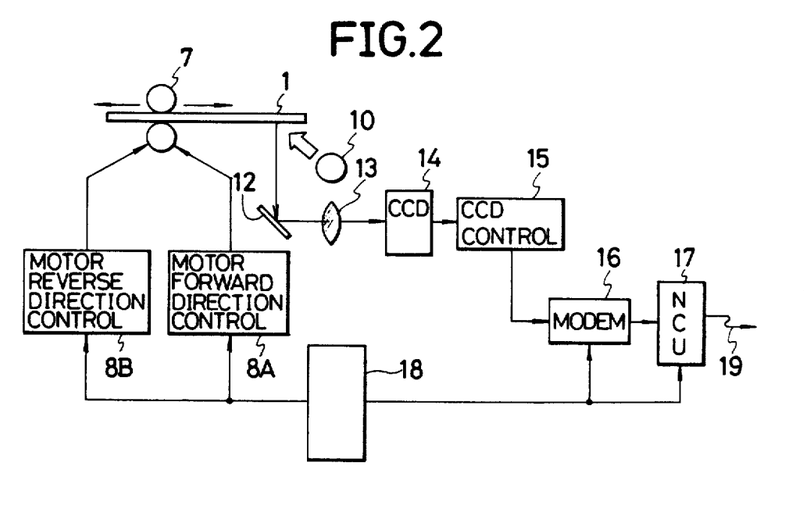
FIG. 2 is a block diagram showing an arrangement of the main part of a facsimile apparatus to realize the communication illustrated in FIG. 1.

FIG. 2 shows an arrangement of the main part of the facsimile apparatus in the embodiment, in which a numeral 7 denotes an apparatus for carrying a transmitting original 1 by and for advancing it one line at a time. For example, a stepping motor for driving which constitutes the carrying apparatus 7 is driven and controlled through motor control circuits 8A and 8B by a control unit (CPU) 18 which is constituted by a memory, microcomputer and the like. At this time, the carrying apparatus 7 is controlled so as to carry the original 1 in the forward direction (to the right in the drawing) by the motor control circuit 8A or in the reverse direction (to the left in the drawing) by the motor control circuit 8B.

The original 1 is illuminated by a light source 10 while it is being carried by one line of a predetermined length at a time in the forward direction. The reflection light is formed as an image on a CCD line sensor 14 through an optical system consisting of a mirror 12 and a lens 13. The image data which was read by the CCD line sensor 14 is read line by line through a CCD control circuit 15 and is further modulated to a state which can be transmitted onto a transmission line by a modem 16. Thereafter, it is sent to an NCU (network control unit) 17.

The modulated image data is sequentially sent to a transmission line 19 through the NCU 17. The operations of the modem 16 and NCU 17 are controlled by the CPU 18 by a method similar to that in a conventional apparatus.

In the above arrangement, in the case of transmitting a long original, the CPU 18 transmits the image data corresponding to the length of recording sheet on the reception side as the image data of the first sheet. Thereafter the CPU 18 interrupts the reading of the image data on the original 1 and thereafter it carries the original 1 by a predetermined length in the reverse direction through the motor control circuit 8B. Then, the CPU 18 restarts the reading of the image data from the point which is located slightly backward and transmits this data as the image data of the second sheet.

The operation of the CPU 18 will be further explained in detail with reference to the flow chart of FIG. 3.

Figure 3:
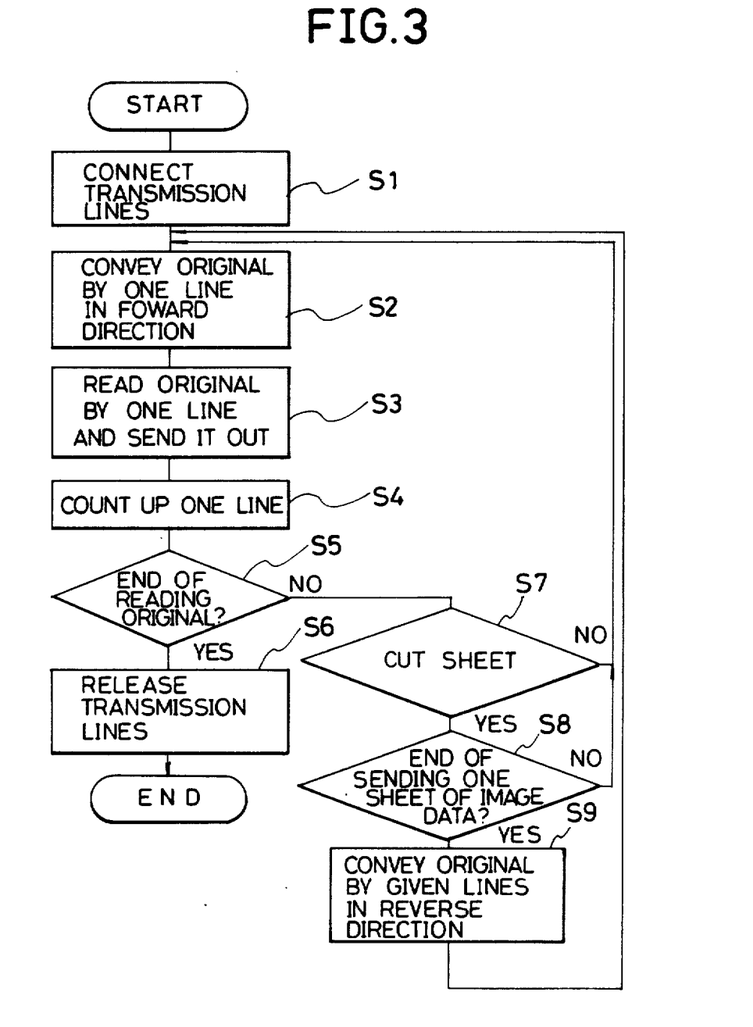
FIG. 3 is a flow chart for explaining the control operation of a control unit 18 in FIG. 2.

First, in step S1 in FIG. 3, the CPU 18 controls the NCU 17 to connect the transmission line 19 to the side of the main apparatus. In the case where the transmission line is a telephone line or the like, the lines are switched from the attached telephone to the main apparatus side.

Subsequently, in step S2, the carrying apparatus 7 is actuated through the motor control circuit 8 to convey the original 1 by one line in the forward direction.

Next, in step S3, the image data on the original 1 is read by one line through the CCD line sensor 14 in a well-known manner. This image data is sent to the modem 16 and modulated, and then it is sent onto the transmission line.

Then, in step S4, a line counter which was set in a memory or the like in the control unit is incremental by one count.

Next, in step S5, a check is made to see if the reading of the original is ended or not. If the reading is ended, step S6 follows; if not, step S7 follows. The end of reading is checked in a well-known manner by detecting the end of the original using a photo-interrupter or the like or by other method.

If the reading of the original is not finished, then by repeating the loop from step S5 to step S2, the image data on the original 1 is read out and transmitted.

In the case where it is determined in step S5 that the whole original has been completely read, the transmission lines are released through the NCU 17 in step S6 and the communication ends. On the contrary, if the reading is not finished, the process routine advances to step S7 and a check is made to see if the receiver on the distant side has cut sheets as recording papers or it has a recording paper such as a roll paper or the like on which the continuous recording is possible. The data on the recording paper is preliminarily transmitted from the apparatus on the reception side using a procedure signal or the like in the case of an apparatus or the like based on the CCITT (International Telegraph and Telephone Consultative Committee) standards. Since this method is well known, it is not described in detail here.

When the receiver on the distant side can perform continuous recording, the process routine returns from step S7 to step S2 and the next line will then be read and transmitted. However, in the case where the apparatus on the distant side has cut sheets and continuous recording cannot be performed, step S8 follows and a check is made to see if the image data of an amount corresponding to one sheet of recording paper on the distant side has been transmitted or not. If the answer is "NO" in step S8, the process routine will return to the foregoing step S2. If "YES", step S9 will follow. This discrimination may be made in a manner such that the length of a sheet of recording paper on the distant side is calculated in terms of the number of lines and this number is stored in a memory or the like and the content of the foregoing line counter is compared with the length of recording paper on the distant side represented by the number of lines, or by other method.

In the case where the image data corresponding to one sheet of receiving paper on the distant side has been completely transmitted, in step S9, the original carry apparatus 7 is conveyed by a predetermined number of lines in the reverse direction through the motor control circuit 8B. Thereafter, the process routine is returned to step S2 and the above-mentioned operations are repeated. Practically speaking with respect to the example of FIG. 1, the original 1 is conveyed in the reverse direction from point P3 to point P2 of the original 1. Due to this, the image data corresponding to the area from point P2 to point P4 of the original 1 is transmitted, so that image corresponding to the area from point P2 to P3 of the original 1 is recorded in the last area of the receiving original 2 and in the first area of the receiving original 3, respectively.

As described above, in the case where the apparatus on the reception side has cut sheet recording papers and cannot perform continuous recording, the division transmission is carried out, and in such a case, the image data corresponding to the portion of the break of the original is overlappingly recorded on the next recording paper. Thus, when an operator on the reception side adheres the recording sheets together to reproduce the original, the overlapped portions can be used as a margin to adhere them, and the work thus becomes very easy. The present invention can be implemented by adding a mechanism for carrying an original in the reverse direction using a conventional arrangement and by slightly modifying the software of a control unit; therefore, it is very simple and cheap.

(Second Embodiment)

Figure 4:
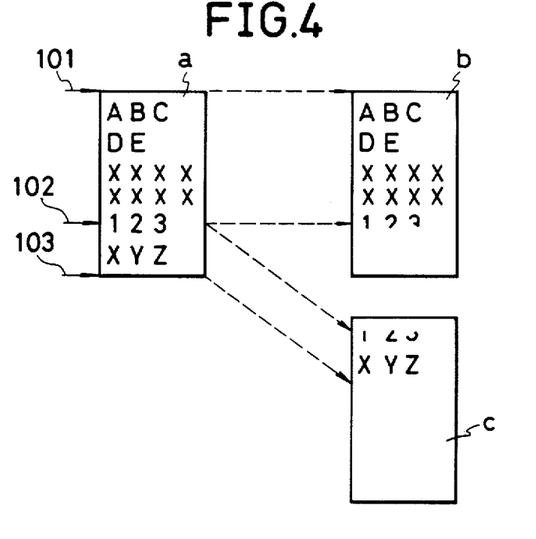
FIGS. 4 and 5 are diagrams for explaining a second embodiment.
Figure 5:
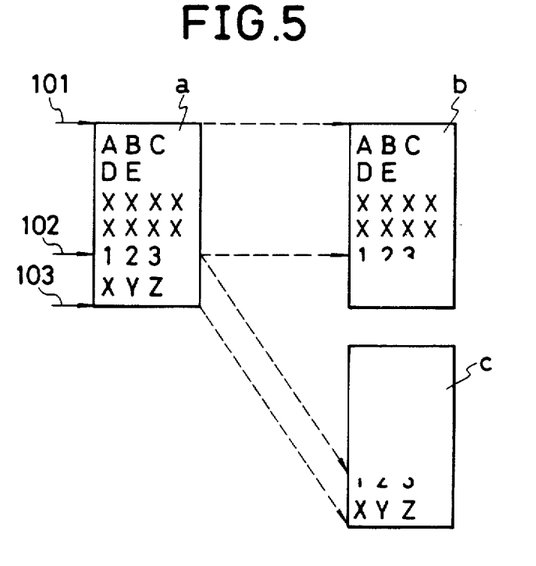

FIGS. 4 and 5 show the states of facsimile communication in the second embodiment of the invention.

The left side of FIG. 4 shows a transmitting original a which is transmitted and the image data on the original a is read by one line at a time from the top to the bottom in the drawing. It is assumed that this original is a high density original such that only the image data in the area from the point indicated at a reference numeral 101 to the point at 102 can be stored in a memory which can sufficiently store the image data of an ordinary density original.

In the embodiment, the image data up to point 102 is read out and when the data is compressed and stored in the memory, in response to a confirmation such that the memory is filled with the image data, the image data up to point 102 is transmitted as the image data of the first sheet. The image data in the area from point 102 to the last point 103 of the original is transmitted as the image data of the second sheet.

As shown in the upper portion on the right side of FIG. 4, the image data from point 101 to point 102 of the transmitting original a is recorded on a first receiving original b on the reception side. On the other hand, as shown in the lower portion on the right side of FIG. 4, the image data from point 102 to point 103 of the transmitting original a is recorded on a second receiving original c. In this example, although the image data from point 102 to point 103 is recorded from the top of the second original c, the recording location is not limited to this location. In another embodiment, as shown in FIG. 5, the image data from point 102 to point 103 of the original a may be recorded at the location corresponding to the transmitting original of the second receiving original c.

Next, an arrangement of a facsimile apparatus for performing the communication as mentioned above will be explained in detail.

Figure 6:
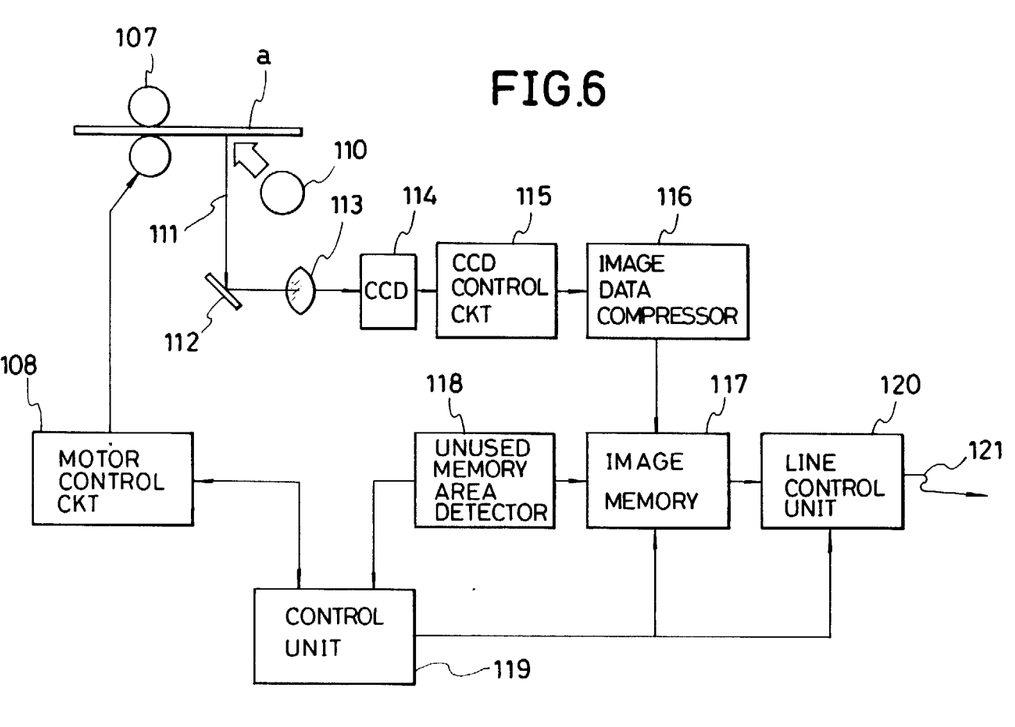
FIG. 6 is a block diagram showing the main part of a facsimile apparatus for performing the communications shown in FIGS. 4 and 5.

FIG. 6 shows an arrangement of the main part of the facsimile apparatus in this embodiment. In the drawing, a numeral 107 denotes a carrying apparatus for carrying the transmitting original a by one line at a time. A stepping motor constituting the carrying apparatus 107 is driven and controlled through a motor control circuit 108 by a control unit 119 which is constituted by a microcomputer and the like.

The original a is illuminated by a light source 110 and the reflection light is formed as an image on a CCD line sensor 114 through an optical system consisting of a mirror 112 and a lens 113. The image data read out by the CCD line sensor 114 is read by one line at a time through a CCD control circuit 115. The information amount of this image data is compressed by an image data compressor 116 and is inputted and stored in an image memory 117.

A line control unit 120 is connected to the image memory 117 and the data in the memory is sequentially sent onto a transmission line 121 through a line control unit 120 under the control of the control unit 119. Also, an unused memory area detector 118 is connected to the image memory 117, so that the unused memory in the memory 117 is reported to the control unit 119.

The control unit 119 allows the image data on the original a to be read out through the CCD line sensor 114 while monitoring the unused memory area in the image memory 117 through the unused memory area detector 118. Then, the image data is sequentially compressed by the image data compressor 116 and stored in the image memory 117. In the case where the memory 117 is filled with the image data or the remaining amount of the unused memory area becomes small and is consumed up to a predetermined amount, the reading of the image data is interrupted and the image data in the memory 117 is sent onto transmission line 121, such as a telephone line or the like through the line control unit 120.

The operation of the control unit 119 mentioned above will be described further in detail with reference to the flow chart of FIG. 7.

Figure 7:
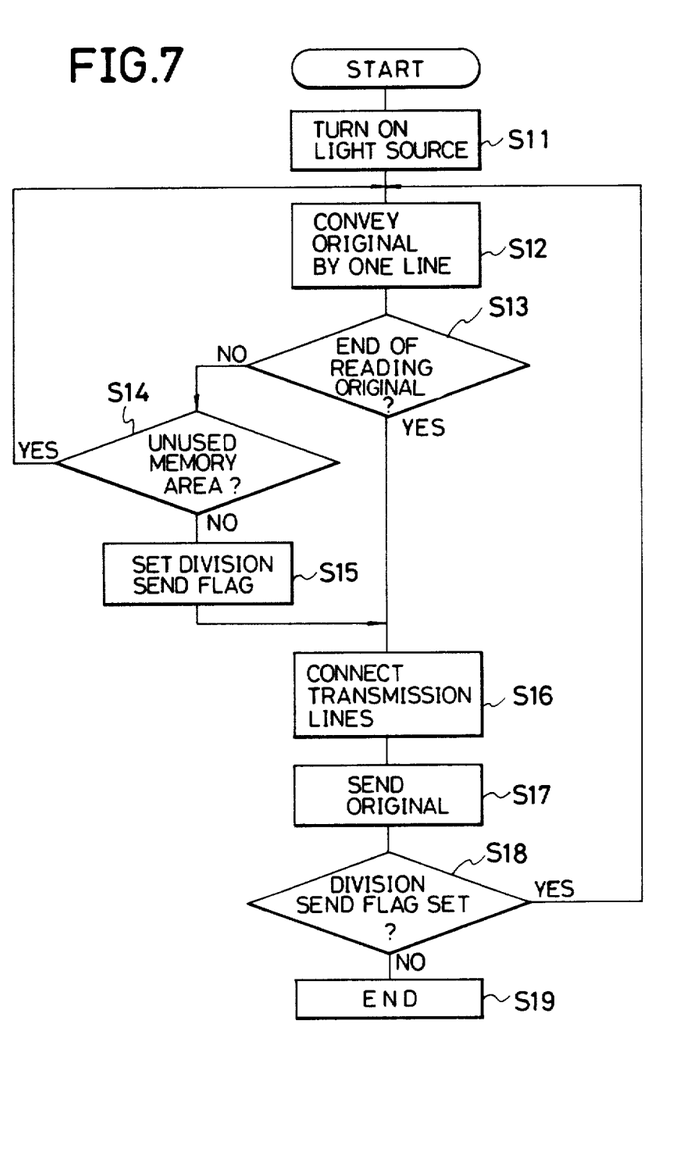
FIG. 7 is a flow chart for explaining the control operation of a control unit 119 in FIG. 6.

First, in step S11 in FIG. 7, the control unit 119 turns on the light source 110 for illuminating the original to start the reading.

Subsequently, in step S12, the carrying apparatus 107 is actuated through the motor control circuit 108 to carry the original a by one line.

Next, in step S13, a check is made to see if the reading of the original has ended or not. If the reading has ended, step S16 follows; if not, step S14 follows. The end of reading may be checked by, for example, detecting whether the lines of one original sheet were carried or not by a counter (which may be a hardware or a software counter).

In the case where the reading of the original is not finished, by repeating the loop from step S14 to step S12, the image data on the original a is read and compressed and stored in the image memory 117. In step S14, an output of the unused memory area detector 118 is checked to see if the unused memory area in the image memory 117 has been completely used or reduced to a predetermined value. In the case where there is a sufficient amount of unused memory area in the image memory 117, the process routine is returned to step S12 and the above operations are repeated. In the case where the remaining amount of the unused memory area is little, step S15 follows and the reading of the image data and the storage of the image data into the memory are interrupted, and then a flag indicative of the division sending is set.

In the case where the remaining amount of the unused memory area is determined to be little in step S14 or where the reading of the image data on the original is determined to be finished in step S13, step S16 follows. Thus, the transmission lines 121 are connected to the facsimile apparatus by controlling the line control unit 120 and in step S17, the image data in the memory 117 is sent.

When the transmission of the image data ends, a check is made to see if the above-mentioned division sending flag is set or not in step S18. In the case where this flag is set, the process routine is returned to step S12 and the above operations are repeated and the remaining image data on the original a is read and transmitted As described above, in case of the high density original image exceeding the memory capacity, the division transmission can be performed, thereby preventing the image data from being lost or the communication from ending as an error. Therefore, it is possible to reliably perform the image communication by use of a memory of a small capacity corresponding to a standard image density.

The control unit 119 shown in the above relates to the case of performing the communication shown in FIG. 4. On the other hand, the communication of FIG. 5 can be performed by a method whereby the number of lines of the original which are read or carried until the reading is interrupted in step S15 in FIG. 7 is stored and this value is sent to the reception side upon the transmission of the second sheet, thereby allowing the blank original to be fed, or by other method.

(Third Embodiment)

Figure 8:
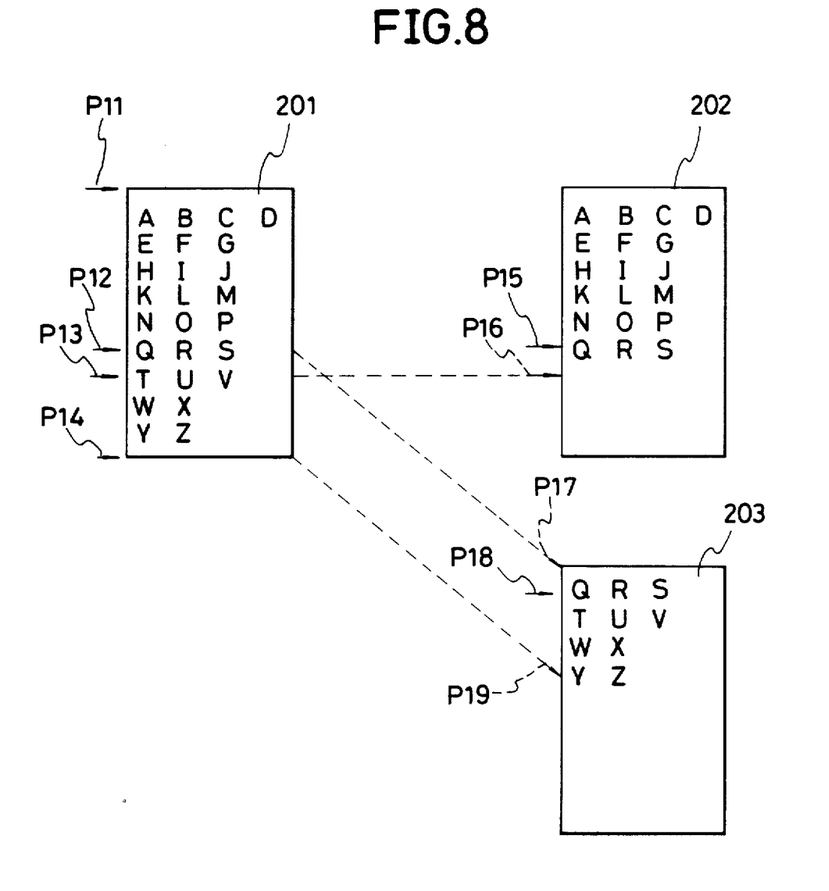
FIG. 8 is a diagram for explaining a third embodiment.

In the third embodiment of the invention, in the case where it is necessary to divisionally transmit the image data, the image data near the division point is overlappingly transmitted as shown in FIG. 8.

A reference numeral 201 indicated on the left side of FIG. 8 denotes a high density original having a data amount which cannot be stored in the image memory of the apparatus even if the data is compressed by means of coding processing. It is assumed that the original 201 is scanned from the top to the bottom in the drawing and the image data from the first point P11 to point P13 of the original 201 can be stored in the image memory.

Therefore, although the image data after point P13 of the original 201 is transmitted as the image data of the second sheet, in such a case, in the apparatus in this embodiment, the image data from point P12 before point P13 to the last point P14 is overlappingly transmitted as the image data of the second sheet.

Thus, the result of recording becomes as shown on the right side in FIG. 8. That is, the image data corresponding to the area from point P11 to P13 of the original 201 is recorded on a first recording sheet 202. The image data from point P12 to P13 of the original 201 is recorded in the area from point P15 to P16 of the first recording sheet 202. On the other hand, the image data from point P12 to P14 of the original 201 is recorded on a second recording sheet 203. Therefore, the image data from point P12 to P13 at the divided portion of the original is overlappingly recorded in the area from point P17 to P18 of the second recording sheet 203.

Figure 9:
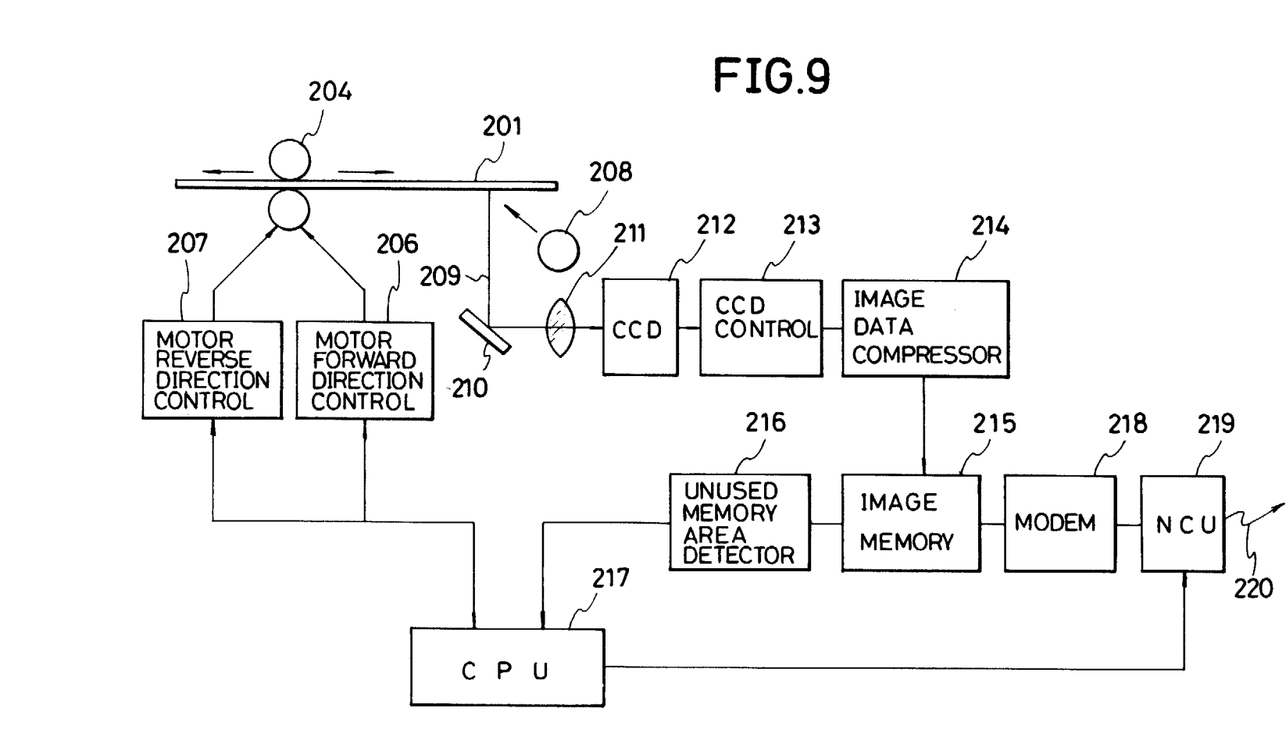
FIG. 9 is a block diagram showing the main part of a facsimile apparatus for performing the communication shown in FIG. 8.

FIG. 9 shows a block diagram of a detailed arrangement of a facsimile apparatus according to this embodiment.

As shown in FIG. 9, the original 201 is carried by carrying rollers 204 in the forward or reverse direction. For convenience, it is now assumed that the carrying direction to the right in the diagram is set to be the forward direction. The carrying rollers 204 are driven by a motor (not shown); however, the rotational direction of this motor is controlled by a motor forward direction control circuit 206 and a motor reverse direction control circuit 207 for control of the above-mentioned carrying direction. Each of the motor forward direction control circuit 206 and motor reverse direction control circuit 207 is constituted by a driver circuit or the like and is controlled by a CPU (Central Processing Unit) 217.

The CPU 217 controls the operation of the whole apparatus in accordance with a predetermined program.

On the other hand, the image on the original 201 is illuminated by a light source 208 constituted by a fluorescent lamp or LED or the like. A reflected light 209 is formed as an image on a CCD sensor 212 through an optical system consisting of a mirror 210 and a lens 211, etc. The CCD sensor 212 is the photoelectric converting line element. This sensor 212 reads the image data by one scanning line at a time and when this reading ends, the original is carried by one scanning line in the forward direction by the carrying rollers 204, so that the image data on the original 201 is sequentially read.

The data readout from the CCD sensor 212 is performed by a CCD control circuit 213. The image data which was read out in response to clocks from the CCD control circuit 213 is compressed by an image data compressor 214 in accordance with a predetermined encoding method and is stored in an image memory 215.

The image memory 215 has a capacity in which the compressed image data on an original of a standard density and a standard size can be sufficiently stored. An unused memory area detector 216 is connected to the image memory 215. The unused memory area detector 216 outputs a detection signal to the CPU 217 when the image memory until the final address in the image memory 215 or until the address before the final address is consumed. The image data stored in the image memory 215 is modulated by a modem 218 due to a predetermined method and is transmitted onto a line 220 through a well-known network control unit (NCU).

The image transmitting operation in the above arrangement will be explained in detail.

Figure 10:
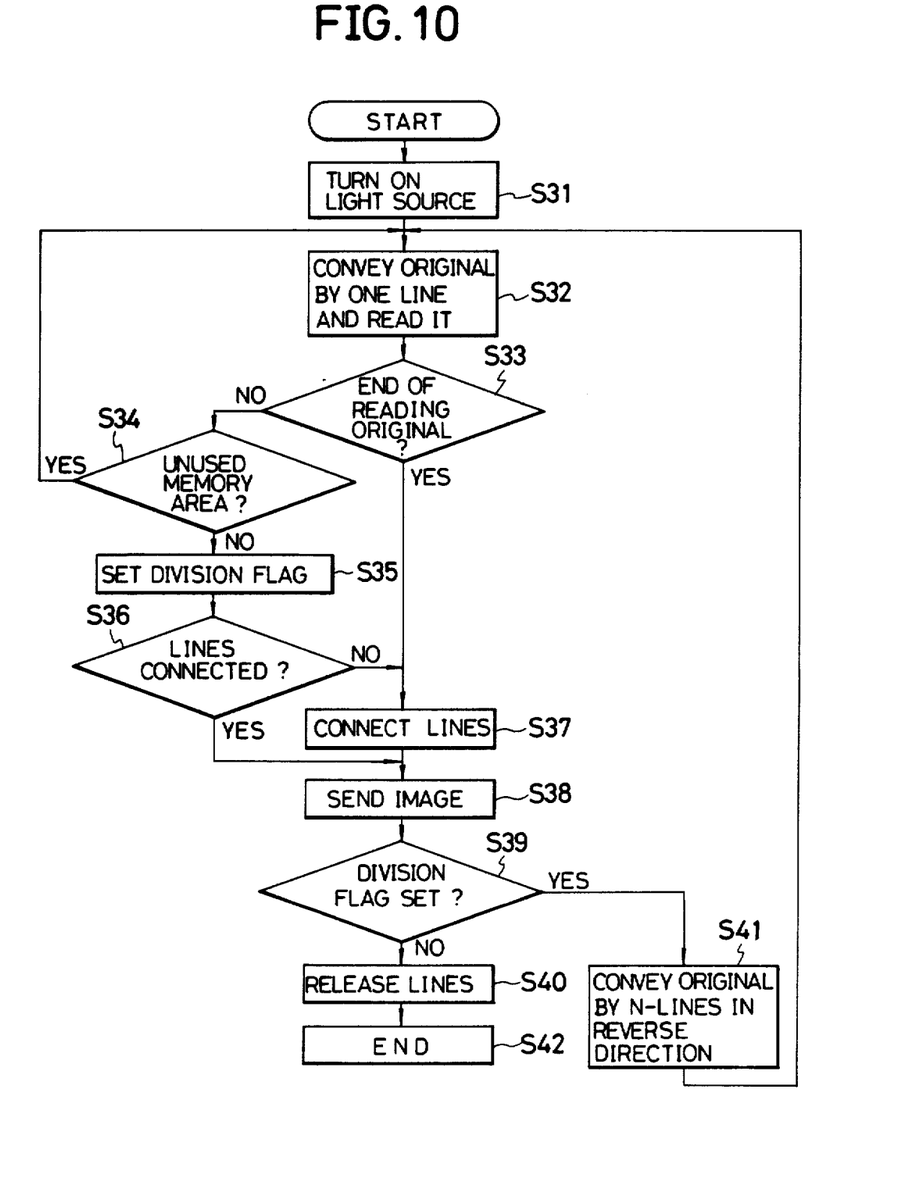
FIG. 10 is a flow chart for explaining the control procedure of a CPU 217 in FIG. 9.

FIG. 10 is a flow chart showing the control procedure of the CPU 217 in FIG. 9.

When the apparatus is actuated, the CPU 217 first turns on the fluorescent lamp 208 to start the reading of the image data in step S31 in FIG. 10.

Next, in step S32, the original 201 is conveyed by one line (scanning line) in the forward direction by the carrying rollers 204 using the motor forward direction control circuit 206, and the image data of one line is read by the CCD sensor 212. The data which has been read is compressed by the image data compressor 214 and is sequentially stored in the image memory 215.

Subsequently, in step S33, a check is made to see if the reading of the original has ended or not. In this step, the presence or absence of the original which should be read is checked using an output from an original detector (not shown) or an output from the CCD sensor 212 or the like. In the case where the reading of the original has ended, step S37 follows; if not, step S34 follows.

In step S34, the CPU 217 checks an output from the unused memory area detector 216 to see if a sufficient amount of capacity remains in the image memory 215 or not. When an unused memory capacity remains, the process routine is returned to step S32. That is, when there is an extra area in the memory, steps S32 to S34 are repeated, so that the image data on the original 201 is sequentially read by one line at a time by the CCD sensor 212. This image data is compressed by the image data compressor 214 and stored in the image memory 215.

When it is determined in step S34 that no memory capacity exists in the image memory, step S35 follows and a processing flag indicating that the division sending is performed is set into a predetermined area in the memory or the like. Thereafter, step S36 is executed. When it is determined that the lines are not connected in step S36, step S37 follows; if they are connected, step S38 will follow.

Namely, the operations to connect the lines are performed in step S37 in a well-known similar manner. The image transmitting operation is executed in step S38. In this step, the data in the image memory 215 is transmitted as the image data of the first sheet. In the case of the division sending, the image data in the remaining area of the original is not read at this stage.

After the data in the image memory 215 has been transmitted, step S39 is executed to see if the above-mentioned flag is set or not. When the division send flag is set, step S41 follows; if not, step S40 will follow and the lines will be disconnected. Then, the operation ends in step S42.

In step S41, the carrying rollers 204 are controlled by the motor reverse direction control circuit 207 to feed the original in the reverse direction by only a predetermined lines N. Then, the process routine is returned to step S32. Namely, speaking with respect to the example of FIG. 8, the original 201 is carried in the reverse direction so that the reading location by the CCD sensor 212 moves from the location at point P33 of the original 201 to the location at P32. This reverse carrying amount may be appropriately set by a person skilled in the art.

In the case of dividing the image data of one sheet of original into a plurality of areas and transmitting them as described above, the image data in the divided areas is overlappingly transmitted. Therefore, when the image is reproduced by adhering the recording papers, by using the overlapped portion as a margin to adhere them, the reproducing work is very simplified.

In addition, since the image data is once stored in the image memory and then it is transmitted, there is the advantage that the high speed communication can be realized in accordance with the processing capability of the apparatus on the reception side even if not so high speed element is used as the CCD sensor 212. In this case, it is enough to prepare the image memory corresponding to at least the image data of one sheet of standard original, so that this makes it possible to perform the storage and transmission of the image data at a high speed by a memory of a small scale.

Furthermore, the foregoing embodiment can be implemented by slight modifications in hardware and software, so that this does not cause an increase in manufacturing cost of the apparatus.

As described above, according to the present invention, even in the case of a long original or an original having a great amount of information, or the like, the information can be certainly transmitted.

Although the present invention has been shown and described with respect to preferred embodiments, various changes and modifications which are obvious to a person skilled in the art to which the invention pertains are deemed to lie within the spirit and scope of the appended claims.

What is claimed is:

1. An image communication apparatus comprising:
    reading means for reading an image on an original for conversion to electrical signals;
    transmission means for transmitting the image data read by said reading means;
    first discrimination means for discriminating a shape of a recording member on a reception side;
    second discrimination means for discriminating, in the case that a recording member on the reception side is a cut-sheet-like recording member, whether or not the single original image can be recorded on the single cut-sheet-like recording member; and
    control means, responsive to a discrimination result of said second discrimination means, for controlling said apparatus such that the single original image is divided to be recorded on a plurality of such cut-sheet-like recording member and in the divisional recording the original image is recorded with paritial overlapping.

2. An apparatus according to claim 1, wherein, in the case of divisional recording, said control means controls said apparatus such that an end portion of the divided original image which is recorded on one cut-sheet-like recording member is again recorded on an initial area of the next succeeding cut-sheet-like recording member.

3. An apparatus according to claim 2, wherein said control means controls said apparatus such that the partially overlapping recording is performed by moving the original backward at said reading means a predetermined distance and again reading a portion of the original.

4. An apparatus according to claim 1, wherein said first discrimination means discrimates whether the reception side uses a roll sheet or a cut sheet, responsive to information transmitted from the reception side concerning the recording member.

5. An apparatus according to claim 1, wherein said second discrimination means counts a quantity of image data transmitted by said transmission means, and discriminates that recording is impossible when the counted quantity reaches a value corresponding to one piece of the recording member on the reception side.

6. An apparatus according to claim 5, wherein said control means controls said apparatus such that the divisional recording is performed when the discrimination result of said second discrimination means indicates that recording is impossible.

7. An apparatus according to claim 1, wherein said second discrimination means discriminates in data transmission that recording is impossible, when the number of lines included in the original image data which is transmitted by said transmission means is counted and the counted number reaches the number of lines corresponding to one piece of the recording member.

8. A data communication method for recording wherein an original image read out at a transmission side is recorded on a cut-sheet-like recording member at a reception side, said method comprising the steps of:
    discriminating whether or not the single original image can be recorded on one piece of the cut-sheet-like recording member; and
    when it is discriminated in said discriminating step that the single original image cannot be recorded on one piece of the cut-sheet-like recording member, divisionally recording the single original image onto a plurality of the cut-sheet-like recording members, the original image being recorded with partial overlapping in the divisional recording.

9. A method according to claim 8, wherein recording capability is discriminated by discriminating whether or not the transmission of the image data from the transmission side is completed when the reception of the image data corresponding to one piece of the recording member on the reception side is completed.

10. A method according to claim 8, wherein, in the divisional recording, the transmission side transmits the image data such that the original image is partially overlapped for the overlapping recording.

11. A method according to claim 10, wherein the original in reading is moved backward at a predetermined distance and is again read out to be transmitted to the reception side such that the original image is recorded with partial overlapping.

12. A method according to claim 9, wherein the original image data is discriminated to be in transmission at the transmission side when the number of line included in the original image data to be transmitted is counted and the counted value reaches a value corresponding to the number of line included in one piece of the recording member on the reception side.

* * * * *

UNITED STATES PATENT AND TRADEMARK OFFICE
CERTIFICATE OF CORRECTION

PATENT NO. : 4,712,139
DATED : December 8, 1987
INVENTOR(S) : YOSHIAKI KATO

It is certified that error appears in the above-identified patent and that said Letters Patent is hereby corrected as shown below:

IN THE DRAWINGS

Sheet 2, Fig. 3, "FOWARD" should read --FORWARD--.

COLUMN 1

Line 20, "not recorded" should read --not be recorded--.
Line 46, "diserable." should read --desirable.--.

COLUMN 3

Line 19, "by" should be deleted.

COLUMN 4

Line 7, "incremental" should read --incremented--.

COLUMN 9

Lines 20-21, "predetermined lines" should read --predetermined number of lines--.
Line 35, "very" should read --greatly--.
Line 54, "certainly" should read --reliably--.

COLUMN 10

Line 10, "member" should read --members--.
Line 12, "paritial" should read --partial--.
Line 26, "discrimates" should read --discriminates--.

UNITED STATES PATENT AND TRADEMARK OFFICE
CERTIFICATE OF CORRECTION

PATENT NO. : 4,712,139
DATED : December 8, 1987
INVENTOR(S) : YOSHIAKI KATO

Page 2 of 2

It is certified that error appears in the above-identified patent and that said Letters Patent is hereby corrected as shown below:

COLUMN 12

Line 5, "line" should read --lines--.
Line 8, "line" should read --lines--.

Signed and Sealed this

Twenty-first Day of June, 1988

Attest:

Attesting Officer

DONALD J. QUIGG

Commissioner of Patents and Trademarks